United States Patent
Wada

(10) Patent No.: US 9,396,449 B2
(45) Date of Patent: Jul. 19, 2016

(54) GAS DELIVERY SYSTEM

(71) Applicant: NIPPON GAS CO., LTD., Tokyo (JP)

(72) Inventor: Shinji Wada, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 14/385,129

(22) PCT Filed: Mar. 14, 2013

(86) PCT No.: PCT/JP2013/001704
§ 371 (c)(1),
(2) Date: Sep. 12, 2014

(87) PCT Pub. No.: WO2013/136799
PCT Pub. Date: Sep. 19, 2013

(65) Prior Publication Data
US 2015/0058066 A1     Feb. 26, 2015

(30) Foreign Application Priority Data
Mar. 14, 2012  (JP) ................................. 2012-057221

(51) Int. Cl.
*G06Q 10/06*  (2012.01)
*G06Q 50/06*  (2012.01)
*G06Q 10/08*  (2012.01)
*G06Q 30/00*  (2012.01)

(52) U.S. Cl.
CPC .......... *G06Q 10/06315* (2013.01); *G06Q 10/06* (2013.01); *G06Q 10/08* (2013.01); *G06Q 50/06* (2013.01)

(58) Field of Classification Search
USPC .......................................................... 705/28
See application file for complete search history.

(56) References Cited

U.S. PATENT DOCUMENTS

| | | | |
|---|---|---|---|
| 2006/0161310 A1* | 7/2006 | Lal ............................ | H02J 3/00 700/295 |
| 2011/0307407 A1* | 12/2011 | Neagu et al. .................. | 705/337 |
| 2012/0084223 A1* | 4/2012 | Briet ................ | G06Q 10/08355 705/338 |
| 2012/0166616 A1* | 6/2012 | Meehan ............. | G06Q 10/0639 709/224 |

FOREIGN PATENT DOCUMENTS

| | | |
|---|---|---|
| JP | H08-329159 | 12/1996 |
| JP | 2002-356231 | 12/2002 |
| JP | 2007-99455 | 4/2007 |

* cited by examiner

*Primary Examiner* — Garcia Ade
(74) *Attorney, Agent, or Firm* — Lee & Hayes, PLLC

(57) ABSTRACT

A distribution cost is reduced by a gas delivery system that delivers gas cylinders. The delivery system is configured to receives operation data including the number of delivered gas cylinders from the mobile terminals of a deliverymen; collect first delivery data and the operation data for all deliverymen, wherein the first delivery data includes the number of gas cylinders to be delivered by each deliveryman on a current day; calculate the number of cylinders in stock in a depository; collect second delivery data including the number of gas cylinders to be delivered by the deliveryman on a next day for the all deliverymen; subtract the number of gas cylinders in stock from the number of gas cylinders to be delivered on the next day; and generate depository delivery data that includes the number of gas cylinders to be transported to the depository by the next day.

8 Claims, 8 Drawing Sheets

| DELIVERY SLIP ID | ---- | ---- | ---- |
|---|---|---|---|
| DELIVERY AREA CODE | XYZ | XYZ | XYZ |
| DELIVERYMAN ID | ABC | ABC | ABC |
| DELIVERY DUE DATE | 2012/3/5 | 2012/3/5 | 2012/3/6 |
| CUSTOMER INFORMATION | CUSTOMER ID | 101234 | 105678 | 201100 |
| | METER NUMBER | 56AB321 | | |
| | ⋮ | | | |
| | GAS CYLINDER TYPE | 50kg | | |
| | THE NUMBER OF REPLACED CYLINDERS | 1 | | |
| | ⋮ | | | |
| | REMARKS | | | |
| | ⋮ | | | |

FIG.6

| DELIVERY SLIP ID | ---- | ---- | ---- |
|---|---|---|---|
| DELIVERYMAN ID | XYZ | XYZ | XYZ |
| CUSTOMER INFORMATION | CUSTOMER ID | ABC | ABC | ABC |
| | METER NUMBER | 56AB321 | | |
| | ⋮ | | | |
| | GAS CYLINDER TYPE | 50kg | | |
| | THE NUMBER OF REPLACED CYLINDERS | 1 | | |
| | DATE OF REPLACEMENT | 2012/3/5 | | |
| | METER INDICATION | 235.2 | | |
| | ⋮ | | | |
| | SAFETY INSPECTION ITEM | | | |
| | ⋮ | | | |

FIG.7

| | |
|---|---|
| DELIVERY SLIP ID | - - - - |
| DELIVERYMAN ID | PQR |
| HUB TERMINAL CODE | A001 |
| DELIVERY DUE DATE | 2012/3/6 |
| DEPOSITORY CODE | B153 |
| THE NUMBER OF CYLINDERS IN STOCK | 23 |
| THE NUMBER OF CYLINDERS CARRIED IN | 200 |
| ⋮ | |

FIG.8

GAS DELIVERY SYSTEM

TECHNICAL FIELD

The present invention relates to a gas delivery system, and more particularly to a gas delivery system employed for delivering, to general homes, apartment buildings, offices, etc., gas cylinders filled with liquefied petroleum (LP) gas.

BACKGROUND ART

Conventionally, LP gas is categorized into gas imported from industrial gas producing countries, and gas domestically generated as a secondary product when petrochemical products are produced. Import stations that store the LP gas transported by tankers from the industrial gas producing countries and oil refinery stations are called primary terminals. The LP gas in the primary terminals is loaded into coastal vessels and tank trucks, and shipped to secondary terminals, which are transit stations located along or away from the coasts. Further, the LP gas carried to the secondary terminals is transported to LP gas filling stations in various places, and is employed to fill gas cylinders in the filling stations.

The gas cylinders filled with the LP gas in the filling stations are delivered by deliverymen to customers' homes, such as general homes, apartment buildings and offices. The empty gas cylinders at the customers' houses are replaced with filled gas cylinders, and the empty gas cylinders are collected at the filling stations. The individual filling stations have fixed delivery areas to be assigned for deliverymen. Delivery slips for two to ten days, indicating the houses of customers in the delivery areas to deliver the gas cylinders, are handed over to the deliverymen.

The delivery slip is prepared by a delivery manager. First, for each customer, the remaining amount of the LP gas in the gas cylinder is predicted based on the gas usage history, the indication of a gas meter (hereinafter "meter indication") installed at the customer's home, a delivery history, etc., and the next delivery due date for a gas cylinder is determined. The remaining amounts of the LP gas in the gas cylinders, thus predicted for all of the customers in the delivery areas allocated to the deliverymen, are added together to determine the amount of delivery of gas cylinders for two to ten days.

When the deliveryman has exchanged the gas cylinders in accordance with the delivery slip, he or she enters, to the delivery slip, the date of replacement, the meter indication on the date of replacement, the cylinder number and the individual safety inspection items. At the end of the daily delivery operation, the delivery slip is submitted to the delivery manager. The delivery manager examines the delivery slip thus returned to the delivery manager to determine whether there are omissions in entry, and thereafter, stores the slip as data used to calculate the next delivery due date. For such a system, various methods for increasing the efficiency for delivery of gas cylinders have been proposed (see patent literature 1).

Further, an idea that employs a handy terminal to simplify the delivery operation has also been also proposed. A delivery slip is stored in the handy terminal, and is interconnected to a service system provided for the delivery manger, so that calculation for the remaining amounts of gas in the gas cylinders, the calculation of the next delivery due date and the collection of the meter indication described above can be efficiently performed.

Recently, the filling operation performed at the individual filling stations is performed collectively at the secondary terminal, which therefore serves as a base for deliverymen, or the secondary terminal is not established for reduction of the distribution cost. However, for companies in charge of delivery of the LP gas, the total cost of distribution from the primary terminal to the customers can not yet be reduced.

Moreover, a handy terminal is an expensive device, and there is a risk that, if the handy terminal is misplaced, a large amount of customer data would be lost. Furthermore, the handy terminal must be carried back to the filling station where the delivery manger stays, and be connected to the service system to update data, and real-time use of information is not satisfactory.

CITATION LIST

Patent Literature

PTL 1: Japanese Patent Laid-Open No. H08-329159 (1996)

SUMMARY OF INVENTION

One objective of the present invention is to provide a gas delivery system, according to which the distribution cost can be greatly reduced by reviewing the arrangement of bases, such as filling stations, and by collecting information in real time using mobile terminals.

To achieve this objective, according to one aspect of the present invention, a gas delivery system for delivering gas cylinders to customers' houses through a depository that is a gas cylinder repository from a hub terminal that fills gas cylinders with gas is provided. The gas delivery system comprises a delivery system connected through a network to mobile terminals of deliverymen delivering the gas cylinders. The delivery system includes: a unit for receiving operation data including the number of gas cylinders that have been delivered, from the mobile terminals of the deliverymen being in charge of delivery areas assigned for the depository; a unit for collecting first delivery schedule data per deliveryman and the operation data for all of the deliverymen in charge of the delivery areas of the depository, wherein the first delivery schedule data includes the number of gas cylinders to be delivered by each of the deliverymen on a current day, and for calculating the number of cylinders in stock that remain in the depository without being delivered on the current day; and a unit for collecting second delivery schedule data per deliveryman for all of the deliverymen in charge of the delivery areas of the depository, wherein the second delivery schedule data includes the number of gas cylinders to be delivered by the deliveryman on a next day, for subtracting the number of gas cylinders in stock from the number of gas cylinders to be delivered on the next day, and for generating depository delivery data that includes the number of gas cylinders to be transported to the depository by the next day.

According to the present invention, the distribution cost can be reduced by reviewing the arrangement of bases, such as the hub terminal and the depositories. Further, since the gas delivery system that interacts with the mobile terminals is constructed, the gas cylinder delivery status can be obtained in real time, and the efficiency of delivery of the gas cylinders can be improved.

BRIEF DESCRIPTION OF DRAWINGS

FIG. 6 is a diagram showing an example for delivery schedule data per deliveryman generated by the delivery system;

FIG. 7 is a diagram sowing an example for operation data received by the delivery system; and FIG. 8 is a diagram showing an example for depository delivery data generated by the delivery system.

DESCRIPTION OF EMBODIMENTS

One embodiment of the present invention will now be described in detail, while referring to drawings.

(1. Gas Delivery System)

Figure 1:
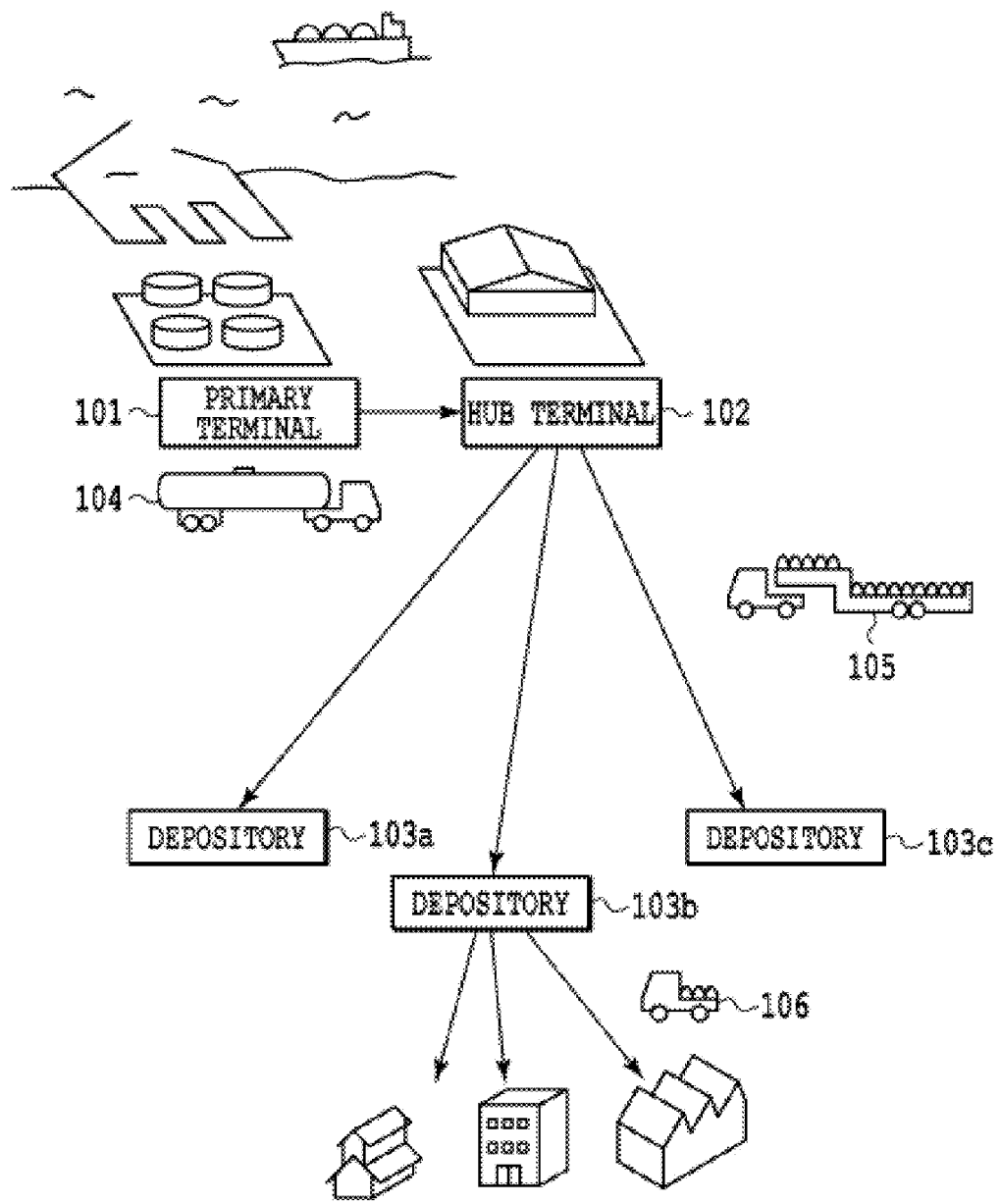
FIG. 1 is a diagram illustrating the general configuration of a gas delivery system according to one embodiment of the present invention.

FIG. 1 shows the general configuration for a gas delivery system according to the embodiment of the present invention. Likely to a conventional arrangement, a primary terminal 101 is an import station, or an oil refinery station that stores LP gas carried by tankers from natural gas producing countries. A hub terminal 102 is located near the primary terminal 101. The hub terminal 102 is a station provided by consolidating two functions, i.e., a conventional secondary terminal and a filling station.

Further, a plurality of depositories 103a to 103c are provided under control of the hub terminal 102. Although the depositories 103 are arranged at locations corresponding to those of the conventional filling stations, the depositories 103 do not include a facility for cylinder filling operation, and serve simply as gas cylinder repositories to be employed as bases for deliverymen. As well as in the conventional case, delivery areas are allocated in advance to the individual depositories 103, and deliverymen in charge of these delivery areas can delivery gas cylinders to the customers in the respective delivery areas. As another embodiment, arranging of depositories and setting of delivery areas may be separately performed, and for each deliveryman, gas cylinders may be loaded from a designated depository, and may be delivered to customers assigned for the deliveryman.

Conventionally, tank trucks are employed for transportation of LP gas between the primary terminal and the secondary terminal, and for transportation of LP gas between the secondary terminal and filling stations. Unloading of gas cylinders and loading of gas cylinders are performed for the individual gas tanks installed in the primary terminal, the secondary terminal and the filling stations. Since a long traveling time is required for the tank truck to travel between the terminals, and it also takes time for the loading/unloading operation in each terminal, only the maximum one or two trips a day is available for transportation between terminals. According to this embodiment, since the hub terminal 102 is arranged near the primary terminal 101, a period in which a tank truck 104 travels between the primary terminal 101 and the hub terminal 102 can reduced, and several trips a day for transportation is possible.

The hub terminal 102 performs filling of gas cylinders, which is conventionally performed at the filling stations. Therefore, various facilities, such as gas tanks and gas filling machines, can be consolidated, and the cost for facilities can be reduced. Furthermore, dealing with the legal inspection and collecting of security staff is possible, and the operation cost can also be reduced. Moreover, the demand fluctuation for LP gas for the individual delivery areas assigned for the depositories 103 can also be absorbed, and the filling operation can be more efficiently performed.

Figure 2A:
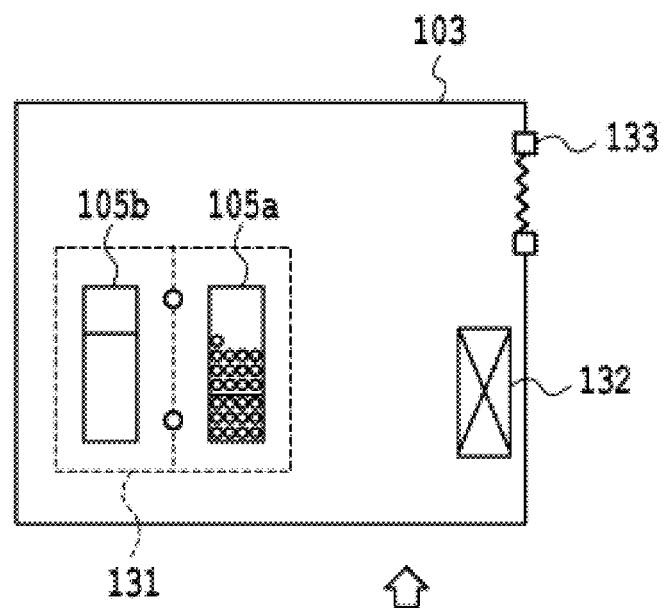
FIG. 2A is a diagram illustrating the arrangement of a depository according to the embodiment of the present invention.
Figure 2B:
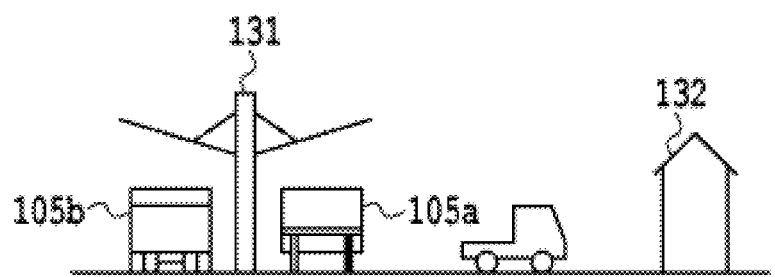
FIG. 2B is a diagram illustrating the arrangement of the depository according to the embodiment of the present invention.

FIGS. 2A and 2B show the structure of the depository according to the embodiment of the present invention. Full cylinders prepared by the hub terminal 102 are loaded on trailers 105, and tractors tow the trailers 105 to deliver the cylinders to the depositories 103. FIG. 2A is a plan view of a depository, and FIG. 2B is a side view taken in a direction indicated by an arrow of the plan view. In the depository 103, a roof 131 to cover a trailer parking area and a rest area 132 for drivers who operate tractor-trailers, deliverymen assigned for the depository 103, etc., are prepared. The tractor travels from the hub terminal 102 to the depository 103, while towing a trailer 105a, on which gas cylinders filled with LP gas (filled gas cylinders) are loaded, and travels from the depository 103 to the hub terminal 102, while towing a trailer 105b on which used gas cylinders are mounted.

When the trailers 105 used to carry the gas cylinders are separated from the tractors, the trailers 105 become gas cylinder storage sites. And the trailers 105 become one part of an unmanned gas cylinder repository that meets the legal requirements with the roof 131 that shields direct sun light and a fence and a gate 133 to restrict the entry into the site. Further, unlike the conventional secondary terminal and the conventional filling stations, various facilities such as gas tanks and filling machines are not necessary, and dealing with the legal inspection and provision of security staff are also not required, so that the cost for establishing the facilities and the operation cost can be greatly reduced.

Moreover, since the height of the platform of the trainer 105 matches the height of the platform of a delivery truck 106, filled gas cylinders can be loaded directly from the trailer to the truck, or used gas cylinders can be loaded directly from the truck to the trailer. Since the trailer can be employed directly as a gas cylinder storage site, gas tanks and a special gas cylinder storage site, which have been prepared in the conventional filling stations, need not be prepared, and the space for the depository can be smaller than the filling station.

The transportation between the hub terminal 102 and the depository 103 will be described later in detail, and the number of cylinders based on demand prediction results for the next day need be carried in by the day before the delivery day. The distance of transportation between the hub terminal 102 and the depository 103 is longer than the conventional distance of transportation between the secondary terminal and the filling station. However, when the trailer-tractors travel at nighttime, the traveling time can be reduced. Furthermore, as for the loading/unloading operation at the depository 103, simply the operation for separating the trailer 105 from the tractor and the operation for moving gas cylinders from the platform of the trailer to the platform of delivery trucks are required, and therefore, a period for the loading/unloading operation can be shortened, and the cost for transportation can be reduced. Further, in the hub terminal 102, since collecting of used gas cylinders is performed by the morning, cylinder filling is performed in the day time, and delivering of the cylinders is performed at night on the same day, working efficiency in the hub terminal 102 can be improved.

Delivery from the depository 103 to the general houses, apartment buildings, offices, etc., is performed by employing small delivery trucks 106, in the same way as the conventional case. When the arrangement of terminals, such as the hub terminal and the depositories, is reviewed, the distribution cost can be reduced.

Next, a data processing system for operating the gas delivery system according to the embodiment of the present invention will now be described. By collecting the gas cylinder delivery status in real time using mobile terminals, the efficiency of delivery of the gas cylinders can be improved between the hub terminal 102 and the depository 103 and between the depository 103 and the customers.

Figure 3:
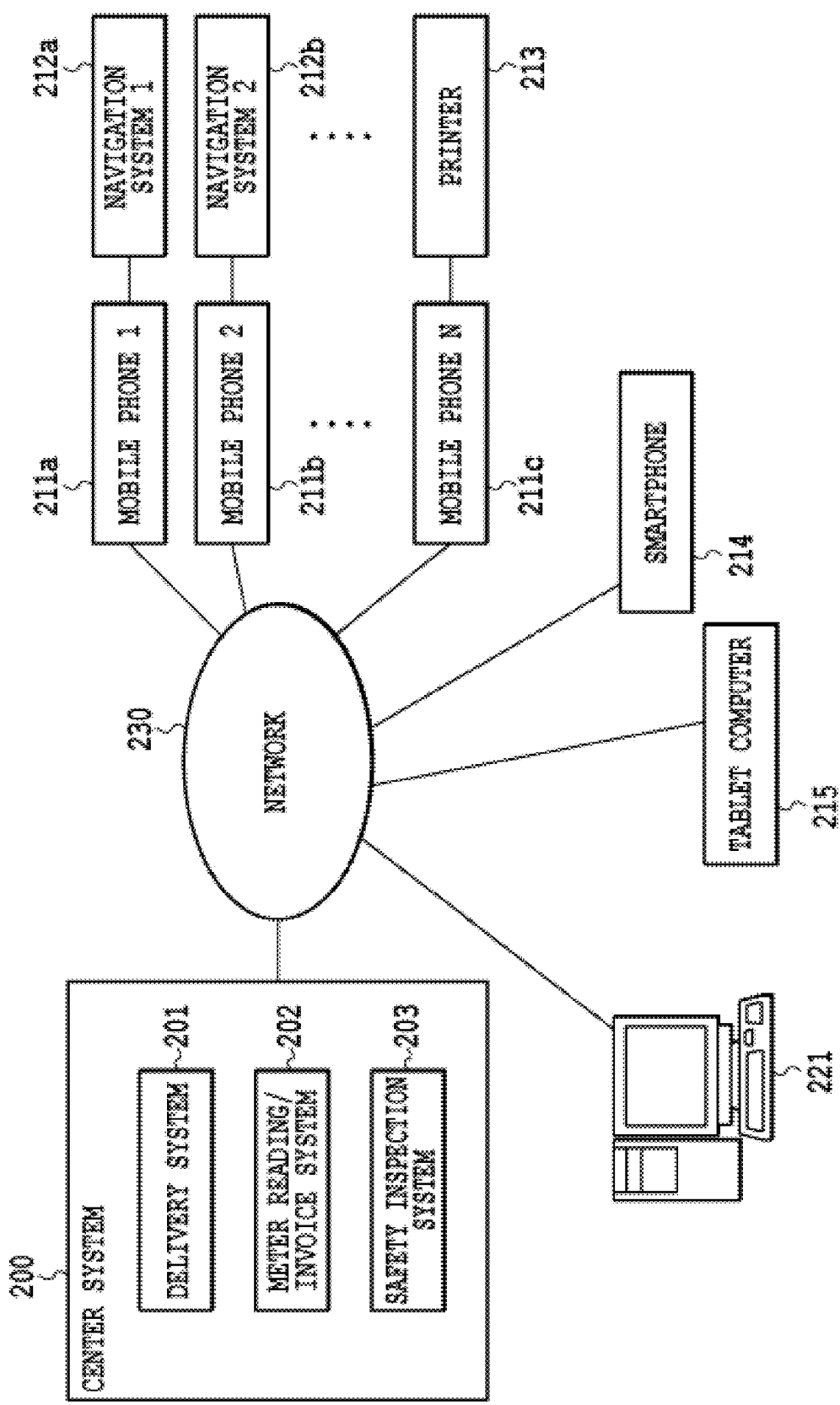
FIG. 3 is a diagram illustrating the configuration of a data processing system according to the embodiment of the present invention.

FIG. 3 shows the configuration of a data processing system according to the embodiment of the present invention. In the data processing system, a center system (a core system) 200, a mobile terminal (a mobile phone 211, a smartphone 214 or a tablet computer 215) carried by each deliveryman, and a personal computer (PC) 221 operated by a delivery manager, etc., are interconnected via a network 230.

Further, a navigation system 212 that can perform communication by a short-range wireless communication technology (e.g., Bluetooth) and a printer 213, for example, can be connected to the mobile phone 211. The mobile terminal can include a function for scanning barcodes and two-dimensional codes. The navigation system 212 can receive address data for a delivery destination (including the postal code and the address of a customer registered in advance and GPS information, such as the latitude and longitude for the customer's house) that are included in delivery schedule data (delivery slip), distributed by the center system 200, and can clearly indicate the address on a map presented on display.

The center system 200 mainly includes a delivery system 201 that manages delivery of gas cylinders, a meter reading/invoice system 202 that performs the accounting operation based on the meter indication of gas meters installed in customers' houses, and a safety inspection system 203 that manages the safety condition for the facilities, such as gas cylinders, the gas meters, etc., installed in the customers' houses.

(2. Delivery System)

The delivery system 201 determines the next gas cylinder delivery due date based on, for example, the gas usage histories that are stored in a database for the individual customers. The delivery system 201 calculates the numbers of gas cylinders for the customers in the area allocated to a deliveryman, in a condition that the next day is the next delivery due date and generates delivery schedule data per deliveryman (delivery slip) for the next day. Then, for each depository 103, the delivery system 201 generates depository delivery data for the next day based on the data for the customers in a condition that the next day is the next delivery due date, and the data indicating the type of gas cylinders and the number of gas cylinders that remain in the depositories 103 without being delivered. Moreover, concerning the delivery history for each deliveryman, such as past delivery schedule data per deliveryman, the rank and days off of the deliveryman, new delivery schedule data per deliveryman are allocated to the deliverymen that are actually on duty, the efficient assignment for the deliverymen is also available.

The delivery system 201 transmits, at predetermined time, the delivery schedule data per deliveryman to the mobile terminal of each deliveryman, either periodically, or in response to the access from the mobile terminal. Further, the delivery system 201 collects, from the mobile terminal, operation data for the customers' houses where the deliveryman actually delivered gas cylinders, and stores the operation data in the database of the delivery system 201.

The address data at the delivery destination within the delivery schedule data per deliveryman that is downloaded into the mobile terminal is transmitted to the navigation system 120, when then displays on a map the location of the customer's house, for which the delivery is scheduled on that day, and supports the deliveryman for delivery.

(3. Meter Reading/Invoice System)

A meter reading represents the operation periodically (monthly) performed by a meter reader to obtain an indication by reading a gas meter installed in each customer house. The meter reader employs his or her mobile terminal to scan a two-dimensional code attached to the gas meter of the customer's house, and to enter a meter indication, and transmit the meter indication to the meter reading/invoice system 202. The meter reading/invoice system 202 identifies a customer based on a meter number included in the two-dimensional code, and stores the date of meter reading and the meter indication in the database. The meter reading/invoice system 202 employs the received meter indication and the previous meter indication, stored in the database, to calculate the gas usage during the pertinent period (each month) and generate invoice data. The gas usage for an individual customer is employed to determine the above described delivery due date for each customer.

(4. Safety Inspection System)

Safety inspection includes a periodically performed legal inspection, a predetermined inspection regulated for an individual area, an inspection performed at the time of opening cock, and an inspection performed at the time of failure of a facility, and a safety inspector performs the inspection for facilities, such as gas cylinders and gas meters, installed at customers' houses. The safety inspection system 203 stores, in a database, information about facilities, such as gas cylinders and gas meters of customers' houses. The facility information includes expiry information, such as the expiration periods of gas cylinders, the items of the legal inspection and the results of the inspection conducted in the past.

The safety inspector uses his or her mobile terminal to scan the two-dimensional code attached to the gas meter of a customer's house, and transmits the two-dimensional code to the safety inspection system 203. The safety inspection system 203 identifies a customer based on the meter number included in the two-dimensional code, and extracts necessary inspection items from the facility information of the customer and downloads these inspection items to the mobile terminal. When the inspection is completed, the safety inspector enters the results of the safety inspection, and transmits the results to the safety inspection system 203, together with the date of inspection. In the safety inspection, the indication of the gas meter is also obtained, and the meter indication is transmitted to the safety inspection system. 203, together with the inspection results. The date of meter reading and the meter indication are stored in the database, and are employed to determine the above described delivery due date for each customer.

(5. Preparation of Delivery Schedule Data Per Deliveryman by Delivery System)

Figure 4:
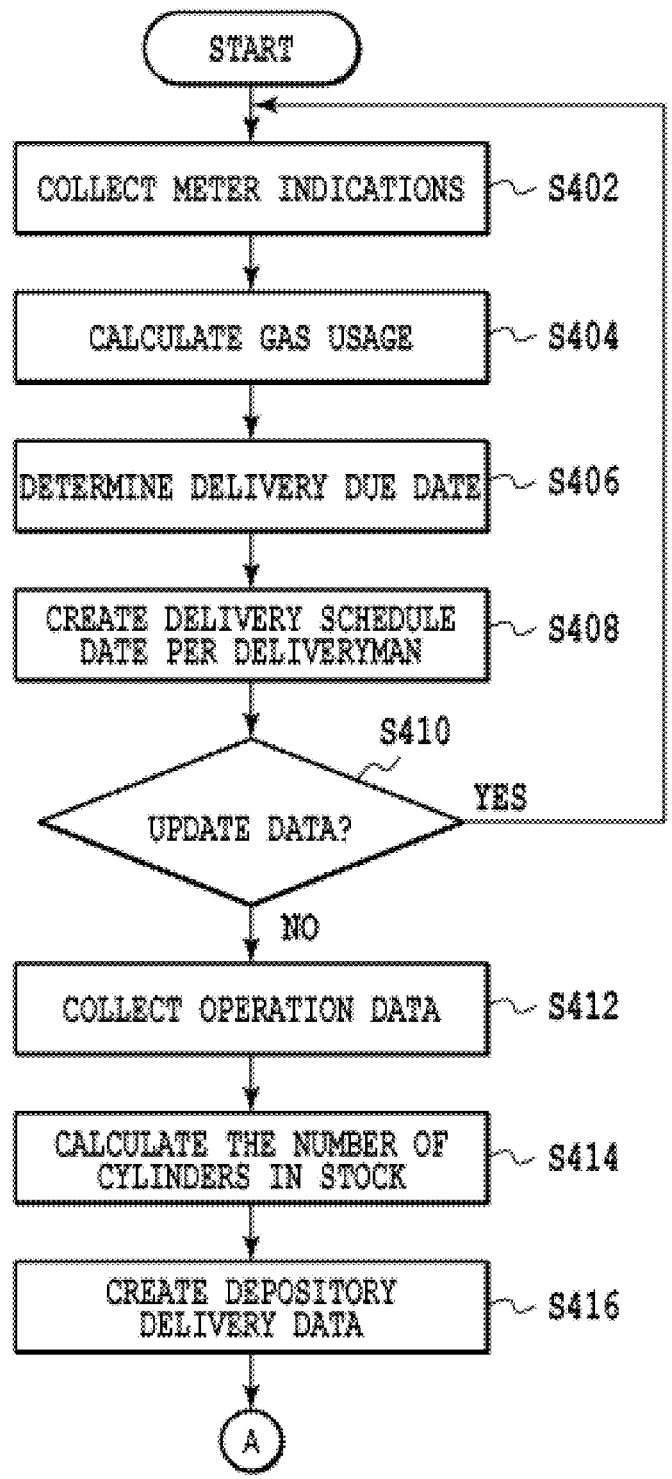
FIG. 4 is a flowchart showing the contents of the processing performed by the delivery system according to the embodiment of the present invention.

FIG. 4 shows the contents of the processing performed by the delivery system according to the embodiment of the present invention. The database of the delivery system 201 stores data for the customers' homes included in the delivery areas for each depository (e.g., the personal information for a customer, facility information about a gas cylinder and a gas meter installed, a gas usage history, a delivery history, etc.). Further, deliveryman data that includes past delivery schedule data per deliveryman, the rank and days off of the deliveryman are stored in the database.

At step 402, the delivery system 201 collects, from the mobile terminals via the network 230, the meter indications obtained through the monthly check by the meter readers, or the meter indications irregularly obtained by the deliverymen or the safety inspectors, and stores the meter indications in the database.

At step S404, the gas usage for a specific period of time is calculated for each customer based on, for example, the gas usage history and the delivery history. For example, the delivery system 201 reads, for each customer, data for the customer's home from the database, and obtains the gas usage history. Next, the delivery history for the customer is examined to obtain the most recent gas usage based on the meter indication obtained at the last delivery and the meter indication obtained at the delivery before the last, and calculates a gas usage A for one day during this period. Based on the gas usage history, the delivery system 201 extracts the gas usage of the same period of the previous year, and calculates a gas usage B for one day. The weighted average for the gas usage A and the gas usage B is calculated to obtain a predicted gas usage for one day.

The delivery system 201 may calculate a predicted gas usage by taking into account the increase-decrease ratio of the gas usage for the recent two months and the corresponding two months in the previous year. Further, in a case wherein it is found from the facility information for the customer stored in the safety inspection system 203, that updating (increasing or removing) of the facility was performed lately, a predetermined increase-decrease ratio may also be additionally considered for the predicted gas usage described above.

At step S406, the remaining amount of LP gas in the gas cylinder is predicted based on the gas usage, and a next delivery due date is determined for an individual customer. For example, the customer facility information stored in the safety inspection system 203 is employed to obtain the type and the capacity of a gas cylinder used by a customer and the number of cylinders required, and a reference gas usage used as a reference for replacement is determined in advance. In the above described example, the day on which the gas usage will exceed the reference gas usage after the previous delivery date is calculated by adding the predicted gas usage for one day, and the next gas cylinder delivery due date is determined.

Specifically, it is assumed that one gas cylinder of 50 kg is installed in a customer's house, and the reference gas usage used as a reference for replacement is 45 kg (the remaining gas amount of 5 kg and a remaining gas ratio of 10%). When the previous delivery date is March 5th, and the predicted gas usage obtained at step S404 is 1.5 kg for each day, April 4th which is 30 days later is a delivery due date.

At step S408, for the area allocated to the deliveryman, the numbers of gas cylinders for customers in a condition that the next day is the next delivery due date, are added together to generate, for each deliveryman in charge of the area, delivery schedule data per deliveryman (delivery slip). In a case wherein the meter indication is obtained, following the previous delivery day, through the meter reading by the meter reader or through the safety inspection by the safety inspector, the day on which the gas usage will exceed the reference gas usage after the date of meter reading, or the date of inspection be calculated, and the next delivery due date can be more accurately determined.

FIG. 6 shows an example for delivery schedule data per deliveryman generated by the delivery system. This is a table, for which the items listed in the delivery schedule data per deliveryman are extracted. Since the delivery of LP gas to the customers is performed by replacing gas cylinders, the next gas cylinder delivery due date and the number of replaced cylinders are provided as the results of the above described processing.

At step S410, in a case wherein updating of the database is performed, e.g., new meter indication is entered, calculation is performed again, beginning from step S402. When meter indication is entered each time by the meter reader, the deliveryman or the safety inspector, the calculation of the gas usage is repeated in this manner, so that the next delivery due date can be more accurately obtained. As a result, the possibility that running out of gas occurs at the customer's house can be reduced. Furthermore, since the accuracy of prediction of the delivery due date can be increased, the delivery efficiency can be greatly improved.

(6. Preparation of Depository Delivery Data by Delivery System)

Next, the delivery system 201 generates depository delivery data. At step S412, operation data that includes the number of gas cylinders that were delivered on the current delivery date is received from the mobile terminal of each of the deliverymen in charge of the delivery areas assigned for the depository.

FIG. 7 shows an example for operation data received by the delivery system. This is a table where items listed in the operation data are extracted. When the deliveryman has actually exchanged the gas cylinders, the operation data is transmitted from the mobile terminal. At this time, the indication of the gas meter at the time of replacement is also transmitted to the delivery system 201. These data are employed to calculate the above described gas usage, and to improve the accuracy for determining the delivery due date.

At step S414, the number of gas cylinders in stock for each depository is calculated. For example, the number of gas cylinders that remain without being delivered as of 19:00 on the current delivery day is calculated based on the delivery schedule data per deliveryman, which includes the number of cylinders to be delivered by the deliveryman on the current delivery day, and the operation data that includes the number of gas cylinders that were delivered on the current delivery day. Naturally, there is a case wherein the number of gas cylinders delivered is greater than the scheduled number of cylinders to be delivered, and the number of delivered gas cylinders is in surplus. The number of remaining gas cylinders without being delivered, or the number of surplus gas cylinders, is added to the number of the gas cylinders as of 19:00 on the previous day (cylinders in stock on the previous day) to obtain the number of cylinders in stock as of 19:00 on the current delivery day (cylinders in stock on the current day). The number of cylinders in stock is calculated for each trailer prepared in a depository, and for each cylinder type.

At step S416, the delivery schedule data per deliveryman that includes the number of gas cylinders to be delivered on the next day are collected to calculate the scheduled number of cylinders to be delivered from the depository on the next day. The number of gas cylinders to be transported to the depository by the next day is (the number of cylinders to be carried in for the next day)=(the scheduled number of cylinders to be delivered on the next day)−(the number of cylinders in stock on the current day)

Specifically, the number of trailers to be employed is determined by adjusting the number of cylinders in stock in the depository, while taking into account the number of gas cylinders to be loaded into a trailer. For simplifying the description, it is assumed that, for an example case, one type of a gas cylinder is employed, 160 gas cylinders are to be loaded on a trailer, and a four trailers are prepared in a depository. When the scheduled number of cylinders to be delivered on the next day=500 and the cylinders in stock on the current day=80, the number of cylinders to be carried in for the next day is 420; however, 480 cylinders are carried in by using three trailers, while taking into account the number of cylinders loaded on the trailer. That is, depository delivery data is generated to exchange, by the time of the next day, three trailers on which the used gas cylinders are loaded and three trailers on which full cylinders are loaded.

FIG. 8 shows an example for depository delivery data generated by the delivery system. This is a table where items listed in the depository delivery data are extracted.

As described above, since the delivery system 201 collects the operation data from the mobile terminals of the deliverymen, the correct number of cylinders in stock on the depository can be obtained. Since, as shown in FIG. 1, the function of the filling station is collectively provided for the hub terminal 102, and the depositories 103 serving as the gas cylinder repositories are arranged in various areas, it is important that stock management be exactly performed by the depositories 103. According to the embodiment, since the gas delivery system where the delivery system 201 and the mobile terminals cooperate with each other is constructed, the gas cylinder delivery status can be obtained in real time, and the efficiency for delivery of gas cylinders can be improved.

Figure 5:
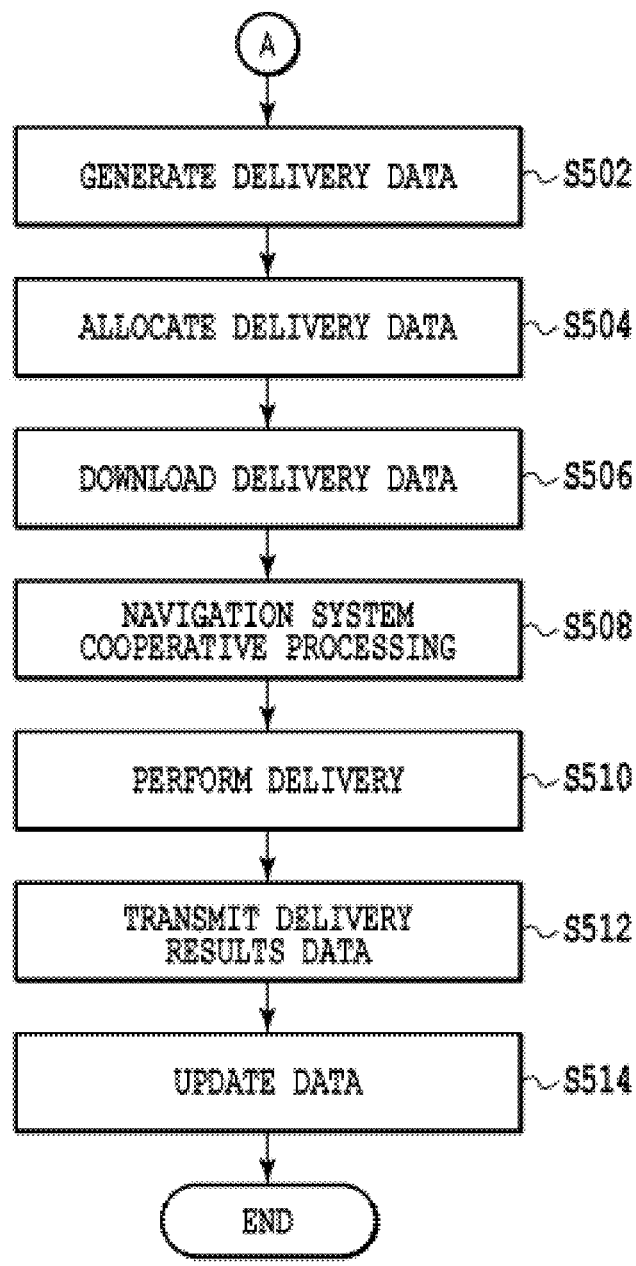
FIG. 5 is a flowchart showing the contents of the processing performed by the delivery system according to the embodiment of the present invention.

FIG. 5 shows the contents of the rest of the processing performed by the delivery system. Step S502 represents the process for generating delivery schedule data per deliveryman and depository delivery data, shown in the flowchart in FIG. 4.

At step S504, concerning the delivery history for each deliveryman, such as past delivery schedule data per deliveryman, the rank and days off of the deliveryman, the delivery system 201 allocates the delivery schedule data per deliveryman to each deliveryman that is actually on duty. For example, assuming that the delivery schedule data per deliveryman for the next day (delivery area=X and the scheduled number of cylinders to be delivered=Y) is generated for an individual deliveryman in charge of the area, as described above. The delivery schedule data per deliveryman is allocated to the deliverymen who are in charge of the delivery area X and who are at the rank to work on the next day and to deliver the scheduled number of cylinders to be delivered=Y. Further, the depository delivery data is transmitted to the hub terminal, and is allocated to the drivers.

At step S506, the delivery system 201 transmits, at predetermined time, the delivery schedule data per deliveryman to the mobile terminal, either periodically, or in response to the access from the mobile terminal of each deliveryman. In a case of responding to the access from the mobile terminal, a process for identifying the deliveryman who is accessing is performed, and the delivery schedule data for the identified deliveryman is transmitted to his or her mobile terminal. The delivery schedule data per deliveryman that is downloaded by the mobile terminal is employed by the deliveryman as a delivery slip for the current day.

At step S508, the delivery schedule data per deliveryman can be transferred to the navigation system 212 of a delivery truck. The navigation system 212 employs the address data for the customers included in the received delivery data, and displays the locations of the houses of the customers on the map on display.

At step S510, when the gas cylinders have been delivered to the depositories or the customers' houses, the deliverymen or the drivers transmit the operation data shown in FIG. 7 to the delivery system 201. For example, the deliveryman performs the safety inspection, such as replacement of gas cylinders, check of the indication of the gas meter and the maintenance of the facility, and transmits the results as delivery result data from the mobile terminal to the delivery system 201. Further, when the trailers are settled in the depository, the drivers transmit the results as delivery result data from the mobile terminals to the delivery system 201 (step S512).

The deliveryman employs his or her mobile terminal to scan a barcode or a two-dimensional code attached to a gas meter, and identifies a facility correlated with a meter number. Since the customers and the meter numbers are uniquely correlated with each other by referring to the facility information stored in the database of the delivery system 201, the deliveryman can easily identify the customer and the facility.

At step S514, the delivery system 201 updates the database based on the delivery result data received from the mobile terminals.

In this embodiment, the mobile terminals owned by the deliverymen or the shipping agency are in charge of reception of the delivery schedule data per deliveryman and the depository delivery data, and transmission of the operation data; however, a PC installed in the hub terminal or a depository may also be employed.

The invention claimed is:

1. A gas delivery system comprising:
an import station primary terminal that receives bulk as from an exporting gas producing source;
a hub terminal that fills gas cylinders with gas transported from the import station primary terminal, wherein the hub terminal is located proximate the import station primary terminal and comprises gas storage tanks and gas cylinder filling machines;
a plurality of depositories that each store the gas cylinders delivered from the hub terminal before being delivered to customers, each one of the plurality of depositories being arranged a customer delivery area and serving as a base for deliverymen to deliver the gas cylinders to customers within the customer delivery area, wherein one or more trailers transport the gas cylinders between the hub terminal and each of the plurality of depositories and provide a storage platform for gas cylinders thereon whenever the one or more trailers are located at one of the plurality of depositories;
a delivery system connected through a network to mobile terminals of deliverymen delivering the gas cylinders, wherein the mobile terminals of the deliverymen are configured to send operation data including a number of gas cylinders that have been delivered to the delivery system,
wherein the gas delivery system is configured to:
perform filling of the gas cylinders at the hub terminal from the gas storage tanks via the gas cylinder filling machines;
collect, via the delivery system from the mobile terminals, first delivery schedule data per deliveryman and the operation data for all of the deliverymen in charge of the customer delivery areas of each of the plurality of depositories, wherein the first delivery schedule data includes a number of gas cylinders to be delivered by each of the deliverymen on a current day;
calculate, via the delivery system, a number of cylinders in stock that remain in the depository without being delivered on the current day;
collect, via the delivery system from the mobile terminals, second delivery schedule data per deliveryman for all of the deliverymen in charge of the customer delivery areas of each of the plurality of depositories, wherein the second delivery schedule data includes a number of gas cylinders to be delivered by the deliveryman on a next day;

subtract, via the delivery system, the number of gas cylinders in stock on the current day from the number of gas cylinders to be delivered on the next day;

calculate, via the delivery system, based on subtracting the number of gas cylinders in stock on the current day while taking into account the number of cylinders loaded on the trailer to generate depository delivery data, a number of gas cylinders to be transported to the depository by the next day; and transmit, via the delivery system, the depository delivery data to the hub terminal to further perform filling of the gas cylinders based on the transmitted depository delivery data.

2. In a gas delivery system comprising
a hub terminal for filling gas cylinders with gas transported from a primary terminal, wherein the hub terminal is located near the primary terminal,
a depository for storing the gas cylinders delivered from the hub terminal to customer delivery areas, wherein the depository has one or more trailers as a gas cylinder storage site, the trailer being used to transport the gas cylinders between the hub terminal and the depository, and the depository is arranged for each delivery area that serves as a base for deliverymen who deliver the gas cylinders to customers' houses, and
a delivery system connected through a network to mobile terminals of deliverymen delivering the gas cylinders,
a method for calculating the number of gas cylinders to be transported to a depository at the delivery system comprises:

filling the gas cylinders at the hub terminal from gas storage tanks with gas cylinder filling machines;

receiving operation data including a number of gas cylinders that have been delivered from the mobile terminals of the deliverymen being in charge of delivery areas assigned for the depository;

collecting, via the mobile terminals, first delivery schedule data per deliveryman and the operation data for all of the deliverymen in charge of the customer delivery areas of the depository, wherein the first delivery schedule data includes a number of gas cylinders to be delivered by each of the deliverymen on a current day;

calculating a number of cylinders in stock that remain in the depository without being delivered on the current day;

collecting, via the mobile terminals, second delivery schedule data per deliveryman for all of the deliverymen in charge of the customer delivery areas of the depository, wherein the second delivery schedule data includes a number of gas cylinders to be delivered by the deliveryman on a next day;

subtracting the number of gas cylinders in stock on the current day from the number of gas cylinders to be delivered on the next day;

calculating, based on subtracting the number of gas cylinders in stock on the current day while taking into account the number of cylinders loaded on the trailer to generate depository delivery data, a number of gas cylinders to be transported to the depository by the next day; and transmitting the depository delivery data to the hub terminal based on calculating the number of gas cylinders to be transported to the depository by the next day.

3. A delivery system in a gas delivery system comprising:
a hub terminal located near a primary terminal that fills gas cylinders with gas transported from the primary terminal; and
a depository that stores the gas cylinders delivered from the hub terminal to customer delivery areas, wherein the depository has one or more trailers as a gas cylinder storage platform, each trailer being used to transport the gas cylinders between the hub terminal and the depository, and wherein the depository is arranged for each customer delivery area that serves as a base for deliverymen who deliver the gas cylinders to the customers, and
the delivery system connected through a network to mobile terminals of deliverymen delivering the gas cylinders, and configured to:

receive, via at least one of the mobile terminals of the deliverymen being in charge of delivery areas assigned for the depository, operation data including a number of gas cylinders that have been delivered;

collect, via at least one of the mobile terminals, first delivery schedule data per deliveryman and the operation data for all of the deliverymen in charge of the delivery areas of the depository, wherein the first delivery schedule data includes a number of gas cylinders to be delivered by each of the deliverymen on a current day;

calculate the number of cylinders in stock that remain in the depository without being delivered on the current day;

collect, via the at least one of the mobile terminals, second delivery schedule data per deliveryman for all of the deliverymen in charge of the delivery areas of the depository, wherein the second delivery schedule data includes a number of gas cylinders to be delivered by the deliveryman on a next day;

subtract the number of gas cylinders in stock on the current day from the number of gas cylinders to be delivered on the next day;

calculate, based on subtracting the number of gas cylinders in stock on the current day while taking into account the number of cylinders loaded on the trailer, a number of gas cylinders to be transported to the depository by the next day;

generate depository delivery data based on the calculated number of gas cylinders to be transported to the depository by the next day; and transmit the depository delivery data to the hub terminal to further perform filling of the gas cylinders based on the transmitted depository delivery data.

4. The delivery system according to claim 3, wherein calculating the number of cylinders in stock that remain in the depository without being delivered on the current day is based in part on the delivery schedule data per deliveryman including a number of gas cylinders to be delivered on the current day and operational data transmitted from the at least one mobile terminal to the delivery system including a number of gas cylinders that were delivered on the current day.

5. The gas delivery system according to claim 1, wherein calculation of the number of cylinders in stock that remain in the depository without being delivered on the current day is based at least in part on the delivery schedule data per deliveryman including a number of gas cylinders to be delivered on the current day and operational data transmitted from the mobile terminals to the delivery system including a number of gas cylinders that were delivered on the current day.

6. The gas delivery system according to claim 1, wherein the gas delivery system generates depository delivery data corresponding to a number of gas cylinders to be transported to a depository.

7. The gas delivery system according to claim 2, wherein calculation of the number of cylinders in stock that remain in the depository without being delivered on the current day is based at least in part on the delivery schedule data per deliveryman including a number of gas cylinders to be delivered on the current day and operational data transmitted from the mobile terminals to the delivery system including a number of gas cylinders that were delivered on the current day.

8. The gas delivery system according to claim 2, wherein the gas delivery system generates depository delivery data corresponding to a number of gas cylinders to be transported to a depository.

\* \* \* \* \*